ާ
3,264,310
INDOLOMORPHANS AND PROCESS FOR THEIR PRODUCTION
John Shavel, Jr., Mendham, and Glenn C. Morrison, Dover, N.J., assignors to Warner-Lambert Pharmaceutical Company, Morris Plains, N.J., a corporation of Delaware
No Drawing. Filed Dec. 9, 1963, Ser. No. 329,219
6 Claims. (Cl. 260—293)

This invention relates to new and useful heterocyclic compounds and relates more particularly to new and novel indolomorphans having the formula:

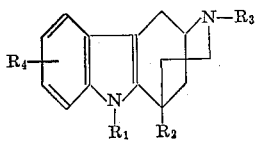

wherein $R_1$ represents hydrogen, lower alkyl of 1 to 6 carbons such as methyl, ethyl, propyl, isopropyl, butyl, isobutyl, n-hexyl and the like, cycloalkyls such as cyclopropyl, cyclobutyl, aralkyl such as phenylethyl, substituted aralkyl such as chlorobenzyl, cycloalkylmethyl, such as cyclopropylmethyl, acyl such as acetyl, benzoyl and the like, and $R_2$ represents lower alkyl of 1 to 6 carbons such as methyl, ethyl, propyl, isopropyl, butyl, isobutyl, n-hexyl and the like, cycloalkyl such as cyclopropyl, cyclobutyl, aralkyl such as phenylethyl, substituted aralkyl, such as chlorobenzyl, phenyl, and substituted phenyl such as chlorophenyl, and $R_3$ represents lower alkyl of 1 to 6 carbons such as methyl, ethyl, propyl, isopropyl, butyl, isobutyl, n-hexyl and the like, cycloalkyls such as cyclopropyl, cyclobutyl, aralkyl such as phenethyl, substituted aralkyl such as chlorobenzyl, cycloalkylmethyl such as cyclopropylmethyl, aralkyl such as phenethyl and substituted β-phenethyl, such as p-nitro-β-phenethyl and p-amino-β-phenethyl, alkenyl such as dimethylallyl and allyl, and $R_4$ represents hydrogen, halogen such as fluorine, chlorine and bromine, lower alkyl of 1 to 6 carbons such as methyl, ethyl, propyl, isopropyl, butyl, isobutyl, n-hexyl and the like, cycloalkyls such as cyclopropyl, cyclobutyl, aralkyl such as phenethyl, substituted aralkyl such as chlorobenzyl, cycloalkylmethyl such as cyclopropylmethyl, lower alkoxy such as methoxy and ethoxy, nitro, amino, and hydroxyl.

Also embraced within the scope of this invention are the pharmaceutically accepted acid addition salts of the aforedescribed indolomorphans and their quaternary ammonium salts. The symbols $R_1$, $R_2$, $R_3$, and $R_4$ as used hereinafter have the meaning defined above.

This invention also includes within its scope a new and novel process for preparing the above compounds as well as the intermediates employed for their synthesis.

The new and novel compounds of this invention have interesting and significant pharmacological activity and are useful as analgesics, anti-tussive and anti-inflammatory agents. In addition they are valuable intermediates in the production of other compounds of the indolomorphan series.

The compounds of this invention may be prepared by reacting a 2-methyl-4-substituted pyridine of the formula:

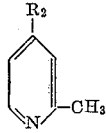

with phenyl lithium and then with diethyl bromoacetal,

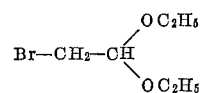

to form the intermediates of the formula:

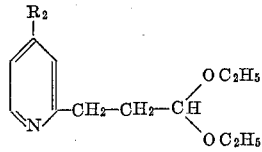

The above reaction is usually carried out at ambient temperature such as from 15° to 30° C. employing organic solvents such as ethyl ether as the reaction medium. The intermediate obtained as the product of the latter reaction is then refluxed with an acidic aqueous solution of a phenyl hydrazine hydrochloride to form an indole compound having a nucleus of the formula:

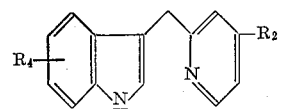
(I)

The second step involves the conversion of Compound I above into a quaternary salt by reacting with a compound of the formula $R_3Y$ in which Y may be a halide radical such as iodide, bromide, or p-toluene sulfonate. The desired reaction takes place readily at ambient temperature with the formation of a compound of the formula:

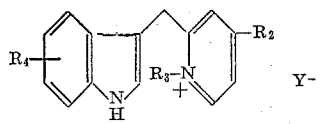
(II)

Reduction of Compound II with an alkali borohydride in water, alcohol or other suitable solvents results in the formation of the isomeric compounds of the formula:

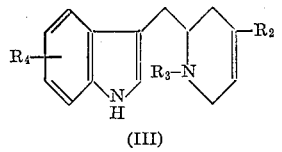 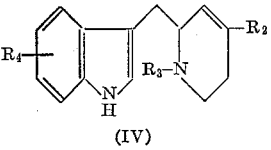
(III) (IV)

This reduction is effected at about 50° to 60° C. for a period of two hours.

These isomers may be readily separated, for example, by chromatographic techniques. Thus, the isomeric mixture may be chromatographed on alumina and the column then eluted with ether. The 1,2,5,6-tetrahydro isomer is eluted in the first few ether fractions while the 1,2,3,6-isomer appears and is recovered from the later ether fractions by evaporation of the solvent.

However, the isomeric mixtures may be subjected to further reaction by which they are cyclized, without first undergoing separation into the respective components, and this cyclization gives the desired indolomorphans of this invention wherein $R_1$ is hydrogen. These compounds may be represented by the formula:

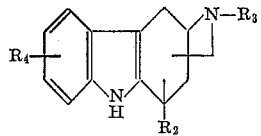
(V)

The above cyclization reaction is usually effected by heating with acidic agents such as phosphoric acid, polyphosphoric acid, hydrobromic acid, and the like at a temperature of about 150° and 175° under an atmosphere of nitrogen.

Finally, Compound V may be methylated employing agents such as dimethylcarbonate in the presence of sodium hydride to form a 6-methyl substituted indolomorphan of the formula:

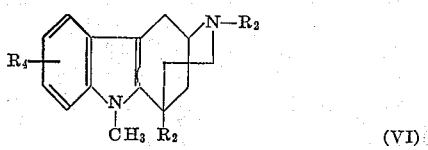

(VI)

Similarly, compounds where $R_1$ are as previously defined may be prepared by alkylation or acylation of Compound V by appropriate chemical means.

The foregoing synthesis may be conveniently illustrated by the following schematic diagram:

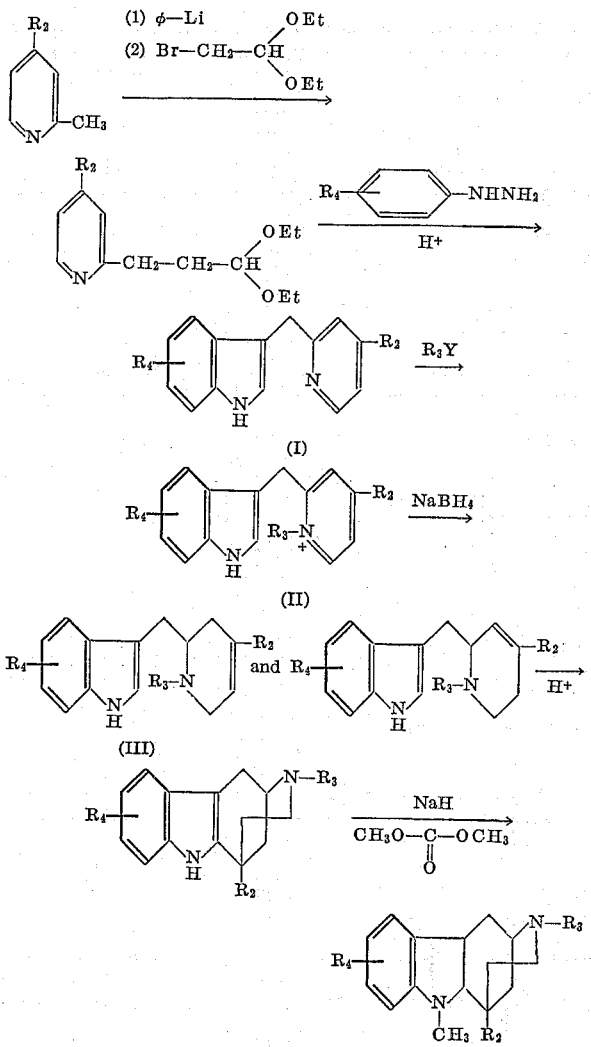

The compounds of our invention may be converted into their pharmaceutically acceptable nontoxic acid addition and quaternary ammonium salts by conventional procedures. Exemplary of nontoxic acid addition salts are those formed with maleic, fumaric, succinic, tartaric, citric, malic, cinnamic, sulfonic, hydrochloric, hydrobromic, sulfuric, phosphoric and nitric acids. The acid addition salts may be prepared in the conventional manner by treating a solution or suspension of the free base in an organic solvent with the desired acid and the salt which forms is recovered by crystallization techniques. The quaternary salts are prepared by heating a suspension of the free base in a solvent with a reactive halide such as methyl iodide, ethyl bromide, n-hexyl bromide, benzyl chloride, or a reactive ester such as methyl sulfate, ethyl sulfate or methyl p-toluene sulfonate.

For therapeutic use, our compounds, either as the free base or in the form of salts, may be combined with conventional pharmaceutical diluents and carriers to form such dosage units as tablets, capsules, suppositories, elixirs, solutions or suspensions.

The following examples are included in order further to illustrate the present invention. All temperatures are given in degrees centigrade.

*Example 1.—2-(indol-3-ylmethyl)-4-methylpyridine*

To 4.68 g. of lithium ribbon suspended in 135 ml. of ether is added a solution of 58.0 g. of bromobenzene in 68 ml. of ether at a rate such that gentle reflux is maintained. Stirring is continued for an additional two hours and the solution allowed to stand for 18–24 hours overnight. Then 36.1 g. of 2,4-lutidine is added at a rate such that the solution just refluxes and after the addition has been completed, stirring is continued for an additional 90 minutes. A solution of 73.2 g. of diethyl bromoacetal in 135 ml. of ether is added with ice bath cooling at a rate such that the temperature remains between 15° and 20°, and then the solution is stirred for an additional 90 minutes. After standing for 18–24 hours, the reaction mixture is poured into a mixture of 180 g. of ice and 270 ml. of water. The ether layer is removed, washed with 225 ml. of water, dried over sodium sulfate and the solvent removed. Distillation of the residue gives 40 g. of an oil, B.P. 87°–95° (0.02 mm.), which is refluxed for 18 hours with 26 g. of phenyl hydrazine hydrochloride, 36 ml. of sulfuric acid and 900 ml. of water. The reaction mixture is made basic with 40% sodium hydroxide solution and extracted with ether. The ethereal layer is washed with water, dried over sodium sulfate and the solvent removed. The residue is dissolved in 200 ml. of hot benzene and 200 ml. of Skelly B (n-hexane) added. On standing there is deposited 2-(indol-3-ylmethyl)-4-methylpyridine as a buff, crystalline solid, M.P. 127°–129°. Further recrystallization gives an analytical sample, M.P. 130°–131°;

$\nu_{max}^{Nujol}$: 725, 1605 cm.$^{-1}$; $_{max}^{CHCl_3}$: 1605, 3340 cm.$^{-1}$; $\lambda_{max}^{EtOH}$: 221mμ (36,000), 267 (7,900), 279 (7,000), 290 (5,500).

Analysis for $C_{15}H_{14}N_2$.—Calcd.: C, 81.05; H, 6.35; N, 12.60. Found: C, 81.03; H, 6.53; N, 12.39.

*Example 2.—2-(indol-3-ylmethyl)-4-methylpyridine methiodide*

To a solution of the base obtained in accordance with Example 1 in 200 ml. of acetone is added 40 ml. of methyl iodide. The solution is scratched with a glass rod until crystallization begins and then allowed to stand for five hours. There is deposited 2-(indol-3-ylmethyl)-4-methylpyridine methiodide in the form of a crystalline solid, M.P. 229°–234°. Recrystallization from ethanol gives an analytical sample, M.P. 235°–237°;

$\nu_{max}^{Nujol}$: 752, 762, 781, 1570, 1635, 3200 cm.$^{-1}$; $\lambda_{max}^{EtOH}$: 212mμ (57,000), 266 (12,500), 282 (shoulder 7,500), 288 (6,000).

Analysis for $C_{16}H_{17}N_2I$.—Calcd.: C, 52.76; H, 4.71; N, 7.69; I, 34.84. Found: C, 53.00; H, 5.00; N, 7.74; I, 34.58.

*Example 3.—1,2,3,6- and 1,2,5,6-tetrahydro-2-(indol-3-ylmethyl)-1,4-dimethylpyridine*

To a solution of 5.14 g. of sodium hydroxide in 73.6 ml. of water is added 124 ml. of methanol. The temperature is adjusted to 25° and 34.4 g. of 2-(indol-3-ylmethyl)-4-methylpyridine methiodide added. The mixture is stirred for 15 minutes, 4.88 g. of sodium borohydride added, stirred for 15 minutes, an additional 4.88 g. of sodium borohydride added, the mixture stirred for 45 minutes and finally heated at 50°–60° for two hours. After cooling to 20° to 30° C., filtration gives 1,2,3,6- and 1,2,5,6-tetrahydro-2-(indol-3-ylmethyl)-1,4-dimethylpyridine in the form of a crystalline solid, M.P. 143°–155°. Three recrystallizations from benzene gives a crystalline solid, M.P. 147°–156°. This mixture is chromatographed on 1500 g. of alumina and eluted with ether. The early ether fractions after recrystallization from benzene give the 1,2,5,6-isomer as a crystalline solid, M.P. 172°–173.5°;

$\nu_{max.}^{Nujol}$: 740, 850 cm.$^{-1}$; $\nu_{max.}^{CHCl_3}$: 1082, 3480 cm.$^{-1}$; $\lambda_{max.}^{EtOH}$: 220 m$\mu$ (37,900), 274 (shoulder 5,750), 282 (6,250), (5,500).

Analysis for $C_{16}H_{20}N_2$.—Calcd.: C, 79.95; H, 8.39; N, 11.66. Found: C, 80.01; H, 8.55; N, 11.68.

The later ether fractions after recrystallization from benzene give the 1,2,3,6-isomer as a crystalline solid, M.P. 163.5°–164.5°;

$\nu_{max.}^{Nujol}$: 742 cm.$^{-1}$; $\nu_{max.}^{CHCl_3}$: 1088, 1135, 3470 cm.$^{-1}$; $\lambda_{max.}^{EtOH}$: 222 m$\mu$ (34,700), 274 (shoulder 5,750), 282 (5,920), 290 (5,200).

Analysis for $C_{16}H_{20}N_2$.—Calcd.: C, 79.95; H, 8.39; N, 11.66. Found: C, 79.80; H, 8.47; N, 11.47.

*Example 4.—2,5-dimethylindolo[2,3-f]morphan*

A solution of 35.0 g. of a mixture of 1,2,3,6- and 1,2,5,6-tetrahydro - 2 - (indol-3-ylmethyl)-1,4-dimethylpyridine in 350 ml. of 85% phosphoric acid is heated at 163° for 18 hours in a nitrogen atmosphere. The reaction mixture is poured into 1400 ml. of cold water, made basic with 40% potassium hydroxide solution, and extracted with ether. The ether layer is washed with water, dried over sodium sulfate and the solvent removed. The residue is chromatographed on alumina. Elution with dichloromethane gives after recrystallization from Skelly B 2,5-dimethylindolo[2,3-f]morphan in the form of a crystalline solid, M.P. 141.5°–142.5°

$\nu_{max.}^{Nujol}$: 720, 732, 742, 3400 cm.$^{-1}$; $\nu_{max.}^{CHCl_3}$: 3470 cm.$^{-1}$; $\lambda_{max.}^{EtOH}$: 227.5 m$\mu$ (35,700), 282 (6,900), 290 (6,000).

Analysis for $C_{16}H_{20}N_2$.—Calcd.: C, 79.95; H, 8.39; N, 11.66. Found: C, 80.06; H, 8.57; N, 11.47.

*Example 5.—2,5,6-trimethylindolo[2,3-f]morphan*

To a suspension of 7.0 g. of 55% sodium hydride dispersed in a mixture of mineral oil, 70 ml. of dimethylcarbonate and 300 ml. of tetrahydrofuran, is added a solution of 6.03 g. of 2,5-dimethylindolo[2,3-f]morphan in 20 ml. of tetrahydrofuran. The mixture is refluxed with stirring for 20 hours. The reaction mixture is poured into 1 liter of cold water, acidified with 20% hydrochloric acid solution, and extracted twice with 250 ml. portions of ether. The aqueous layer is made basic with 10% sodium hydroxide solution and extracted with 300 ml. portions of ether twice. The ether layers are combined, washed with 150 ml. of water, dried over sodium sulfate, and the solvent removed. There remained 2,5,6-trimethylindolo[2,3-f]morphan in the form of an oil. Distillation gives an analytical sample in the form of a solid, M.P. 90°–91.5°;

$\nu_{max.}^{Nujol}$: 740 cm.$^{-1}$; $\lambda_{max.}^{EtOH}$: 230 m$\mu$ (36,600), 278 (shoulder 6,600), 284 (7,100), 293 (6,700)

Analysis for $C_{17}H_{22}N_2$.—Calcd.: C, 80.27; H, 8.72; N, 11.01. Found: C, 80.28; H, 8.65; N, 10.76.

*Example 6.—2-(indol-3-ylmethyl)-4-methyl-1-phenethylpyridinium iodide*

A solution of 6.69 g. of 2-(indol-3-ylmethyl)-4-methylpyridine and 6.96 g. of phenethyl iodide in 20 ml. of ethanol is refluxed for 20 hours. While the solution is still hot, 40 ml. of ethyl acetate is added. On standing there is deposited 2-(indol-3-ylmethyl)-4-methyl-1-phenethylpyridinium iodide, M.P. 191.5°–192.5°, after further recrystallization from ethanol-ethyl acetate.

Analysis for $C_{23}H_{23}N_2I$.—Calcd.: C, 60.80; H, 5.10; N, 6.16. Found: C, 60.77; H, 5.11; N, 5.98.

*Example 7.—1,2,3,6-tetrahydro-2-(indol-3-ylmethyl)-4-methyl-1-phenethylpyridine*

To a solution of 0.55 g. of sodium hydroxide in 8 ml. of water is added 13 ml. of ethanol. The temperature is adjusted to 25° C. and 4.55 g. of 2-(indol-3-ylmethyl)-4-methyl - 1 - phenethylpyridinium iodide added. Then 0.52 g. of sodium borohydride is added and the mixture heated at 50°–60° C. for 2 hours. The reaction mixture is diluted with water and extracted with ether. The ether layer is dried over sodium sulfate and the solvent removed. Chromatography on alumina gives on elution with methylene chloride 1,2,3,6-tetrahydro-2-(indol-3-ylmethyl)-4-methyl - 1 - phenethylpyridine, M.P. 138°–139°, after recrystallization from benzene.

Analysis for $C_{23}H_{26}N_2$.—Calcd.: C, 83.59; H, 7.93; N, 8.48. Found: C, 83.87; H, 7.95; N, 8.72.

*Example 8.—5-methyl-2-phenethylindolo[2,3-f]morphan*

A solution of 2.0 g. of 1,2,3,6-tetrahydro-(2-indol-3-ylmethyl)-4-methyl-1-phenethylpyridine in 20 ml. of 85% phosphoric acid is heated at 165° C. for 40 hours. The reaction mixture is poured into water, made basic with sodium hydroxide solution and extracted with ether. The ether layer is dried over sodium sulfate and the solvent removed. Chromatography of the residue on alumina gives, upon elution with methylene chloride, 5-methyl-2-phenethylindolo[2,3-f]morphan. Treatment of an ethereal solution of the base with ethereal hydrogen bromide gives the hydrobromide, M.P. 177°–180°, after recrystallization from ethyl acetate.

Analysis for $C_{23}H_{27}N_2Br$.—Calcd.: C, 67.15; H, 6.62; N, 6.81; Br, 19.42. Found: C, 67.33; H, 6.63; N, 6.63; Br, 19.63.

*Example 9.—2-(5-chloroindol-3-ylmethyl)-4-methylpyridine*

To 4.68 g. of lithium ribbon suspended in 135 ml. of ether is added a solution of 58.0 g. of bromobenzene in 68 ml. of ether at a rate such that gentle reflux is maintained. Stirring is continued for an additional two hours and the solution allowed to stand for 18–24 hours overnight. Then 36.1 g. of 2,4-lutidine is added at a rate such that the solution just refluxes and after the addition has been completed stirring is continued for an additional 90 minutes. A solution of 73.2 g. of diethyl bromoacetal in 135 ml. of ether is added with ice bath cooling at a rate such that the temperature remains between 15° and 20°, and then the solution is stirred for an additional 90 minutes. After standing for 18–24 hours, the reaction mixture is poured into a mixture of 180 g. of ice and 270 ml. of water. The ether layer is removed, washed with 225 ml. of water, dried over sodium sulfate and the solvent removed. Distillation of the residue gives 40 g. of an oil, B.P. 87°–95° (0.02 mm.), which is refluxed for 18 hours with 32.2 g. of p-chlorophenylhydrazine hydrochloride, 36 ml. of sulfuric acid and 900 ml. of water. The reaction mixture is made basic with 40% sodium hydroxide solution and extracted with ether. The ethereal layer is washed with water, dried over sodium sulfate and the solvent removed. The residue is dissolved in 200 ml. of hot benzene and on standing there is deposited 2-(5-chloroindol-3-ylmethyl)-4-methylpyridine as a crystalline solid, M.P. 159°–160.5° C. Further recrystallization gives an analytical sample, M.P. 161°–162°.

Analysis for $C_{15}H_{13}N_2Cl$.—Calcd.: C, 70.17; H, 5.11; N, 10.91; Cl, 13.81. Found: C, 70.34; H, 5.24; N, 10.71; Cl, 14.02.

*Example 10.—2-(5-chloroindol-3-ylmethyl)-4-methylpyridine methiodide*

To a solution of the base obtained in accordance with Example 9, in 200 ml. of acetone is added 40 ml. of methyl iodide. The solution is scratched with a glass rod until crystallization begins and then is allowed to stand for five hours. There is deposited 2-(5-chloroindol-3- ylmethyl)-4-methylpyridine methiodide in the form of a crystalline solid, M.P. 188.5°–190° C. Recrystallization from ethanol gives an analytical sample, M.P. 190°–191°.

Analysis for $C_{16}H_{16}N_2ClI$.—Calcd.: C, 48.20; H, 4.05; N, 7.03. Found: C, 48.25; H, 3.83; N, 6.92.

*Example 11.—9-chloro-2,5-dimethylindolo[2,3-f] morphan*

To a solution of 2.72 g. of sodium hydroxide in 39 ml. of water is added 65 ml. of methanol. The temperature is adjusted to 25° and 20.0 g. of 2-(5-chloroindol-3-ylmethyl)-4-methylpyridine methiodide is added. Then 2.58 g. of sodium borohydride is added and the mixture stirred for 2 hours. Filtration gives 11.5 g. of a solid which is heated with 115 ml. of 85% phosphoric acid in a nitrogen atmosphere. The reaction mixture is poured into 1500 ml. of water, made basic with 40% sodium hydroxide solution and extracted with 400 ml. of ether. The ether layer is dried over sodium sulfate and the solvent removed. Chromatography on alumina gives, on elution with methylene chloride, 9-chloro-2,5-dimethylindolo[2,3-f]morphan in the form of a crystalline solid, M.P. 165.5°–166.5°, after recrystallization from Skelly B.

Analysis for $C_{16}H_{19}N_2Cl$.—Calcd.: C, 66.94; H, 6.97; N, 10.19; Cl, 12.90. Found: C, 66.98; H, 7.10; N, 10.43; Cl, 12.74.

It is to be understood that the foregoing detailed description is given merely by way of illustration and that many variations may be made therein without departing from the spirit of our invention.

Having described our invention, what we desire to secure by Letters Patent is:

1. A compound selected from the group consisting of those having the formula:

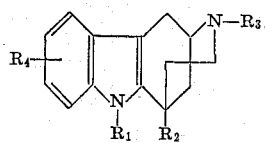

wherein $R_1$ is a member of the group consisting of hydrogen, lower alkyl of 1 to 6 carbons, cycloalkyls, aralkyl, substituted aralkyl, cycloalkylmethyl and acyl, $R_2$ is a member of the group consisting of lower alkyl of 1 to 6 carbons, cycloalkyl, aralkyl, substituted aralkyl, phenyl and substituted phenyl, $R_3$ is a member of the group consisting of lower alkyl of 1 to 6 carbons, cycloalkylmethyl, aralkyl, alkenyl, and $R_4$ is a member of the group consisting of hydrogen, halogen such as fluorine, chlorine and bromine, lower alkyl of 1 to 6 carbons, lower alkoxy such as methoxy and ethoxy, nitro, amino, and hydroxyl, and the nontoxic pharmaceutically acceptable acid addition and quaternary ammonium salts thereof.

2. 2,5-dimethylindolo[2,3-f]morphan.
3. 2,5,6-trimethylindolo[2,3-f]morphan.
4. 5-methyl-2-phenethylindolo[2,3-f]morphan.
5. 9-chloro-2,5-dimethylindolo[2,3-f]morphan.
6. Process for the production of a compound of the formula:

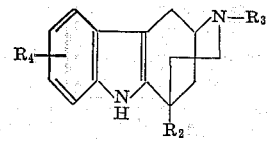

wherein $R_2$ is a member of the group consisting of lower alkyl of 1 to 6 carbons, cycloalkyl, aralkyl, substituted aralkyl, phenyl and substituted phenyl, $R_3$ is a member of the group consisting of lower alkyl of 1 to 6 carbons, cycloalkylmethyl, aralkyl and alkenyl and $R_4$ is a member of the group consisting of hydrogen, halogen, lower alkyl of 1 to 6 carbons, lower alkoxy, nitro, amino, and hydroxyl, which comprises contacting a compound selected from the group consisting of those having the formulae:

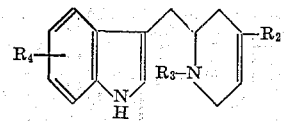

and

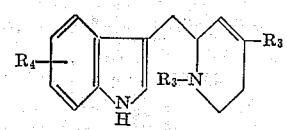

with an acid.

References Cited by the Examiner

UNITED STATES PATENTS

| | | | |
|---|---|---|---|
| 2,773,875 | 12/1956 | Finkelstein et al. | 260—296 |
| 3,012,040 | 12/1961 | Lind et al. | 260—319 |
| 3,136,770 | 6/1964 | Gray | 260—296 |
| 3,138,603 | 6/1964 | May | 260—293 |

OTHER REFERENCES

Buchi, J. Am. Chem. Soc., vol. 81, pp. 4433–4434 (1959).

Miller, J. Am. Chem. Soc., vol. 75, pp. 4849 (1953).

WALTER A. MODANCE, *Primary Examiner.*

A. D. SPEVACK, *Assistant Examiner.*